(12) United States Patent
Hart et al.

(10) Patent No.: US 12,231,963 B2
(45) Date of Patent: Feb. 18, 2025

(54) TIME SENSITIVE NETWORKING (TSN) QUALITY OF SERVICE (QOS) IN OVERLAPPED ADMINISTRATIVE DOMAINS

(71) Applicant: Cisco Technology, Inc., San Jose, CA (US)

(72) Inventors: Brian D. Hart, Sunnyvale, CA (US); Pooya Monajemi, Irvine, CA (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 364 days.

(21) Appl. No.: 17/820,917

(22) Filed: Aug. 19, 2022

(65) Prior Publication Data

US 2024/0064576 A1 Feb. 22, 2024

(51) Int. Cl.
*H04W 72/27* (2023.01)
*G06Q 30/08* (2012.01)
*H04W 12/108* (2021.01)
*H04W 12/73* (2021.01)
*H04W 28/02* (2009.01)
*H04W 28/24* (2009.01)

(52) U.S. Cl.
CPC ............ *H04W 28/24* (2013.01); *G06Q 30/08* (2013.01); *H04W 12/108* (2021.01); *H04W 12/73* (2021.01); *H04W 28/0236* (2013.01)

(58) Field of Classification Search
None
See application file for complete search history.

(56) References Cited

U.S. PATENT DOCUMENTS

| 7,177,832 B1 | 2/2007 | Semret | |
| 2005/0036465 A1* | 2/2005 | Waxman | H04W 36/08 370/338 |
| 2009/0248996 A1* | 10/2009 | Mandyam | G06F 3/04847 711/E12.001 |
| 2011/0029347 A1 | 2/2011 | Kozat et al. | |
| 2011/0142019 A1* | 6/2011 | Bharghavan | H04W 36/38 370/338 |

(Continued)

OTHER PUBLICATIONS

Salvatore D'Oro, Laura Galluccio, Panayotis Mertikopoulos, Giacomo Morabito and Sergio Palazzo. "Auction-Based Resource Allocation in Openflow Multi-Tenant Networks", Sciencedirect.com, Jan. 2017 (14 pgs.).

(Continued)

*Primary Examiner* — Minh Trang T Nguyen
(74) *Attorney, Agent, or Firm* — Merchant & Gould P.C.

(57) ABSTRACT

Time Sensitive Networking (TSN) Quality of Service (QoS) in overlapped administrative domains may be provided. A first Access Point (AP) may detect at least a second AP in a Co-Channel Interference (CCI) range. A micro-transaction auction between the first AP and at least the second AP may be established, and the first AP may provide compensation to second AP to acquire an agreement, from the second AP, to forgo transmitting during an upcoming service period. Next, the first AP may schedule transmissions for the service period and then transmit in the service period without interference from the second AP.

20 Claims, 4 Drawing Sheets

(56) References Cited

U.S. PATENT DOCUMENTS

| | | | |
|---|---|---|---|
| 2011/0282928 A1* | 11/2011 | Ball | H04M 15/805 |
| | | | 709/202 |
| 2016/0204951 A1* | 7/2016 | Walton | H04M 15/51 |
| | | | 370/259 |
| 2018/0176845 A1* | 6/2018 | Visuri | H04W 36/22 |
| 2020/0015043 A1* | 1/2020 | Patil | H04W 4/06 |
| 2020/0259896 A1 | 8/2020 | Sachs et al. | |

OTHER PUBLICATIONS

Aurel A. Lazar and Nemo Semret. "Design, Analysis and Simulation of the Progressive Second Price Auction for Network Bandwidth", Dept. of Electrical Engineering, Columbia University, Apr. 1, 1998 (36 pgs.).

* cited by examiner

US 12,231,963 B2

TIME SENSITIVE NETWORKING (TSN) QUALITY OF SERVICE (QOS) IN OVERLAPPED ADMINISTRATIVE DOMAINS

TECHNICAL FIELD

The present disclosure relates generally to providing Time Sensitive Networking (TSN) Quality of Service (QoS) in overlapped administrative domains.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
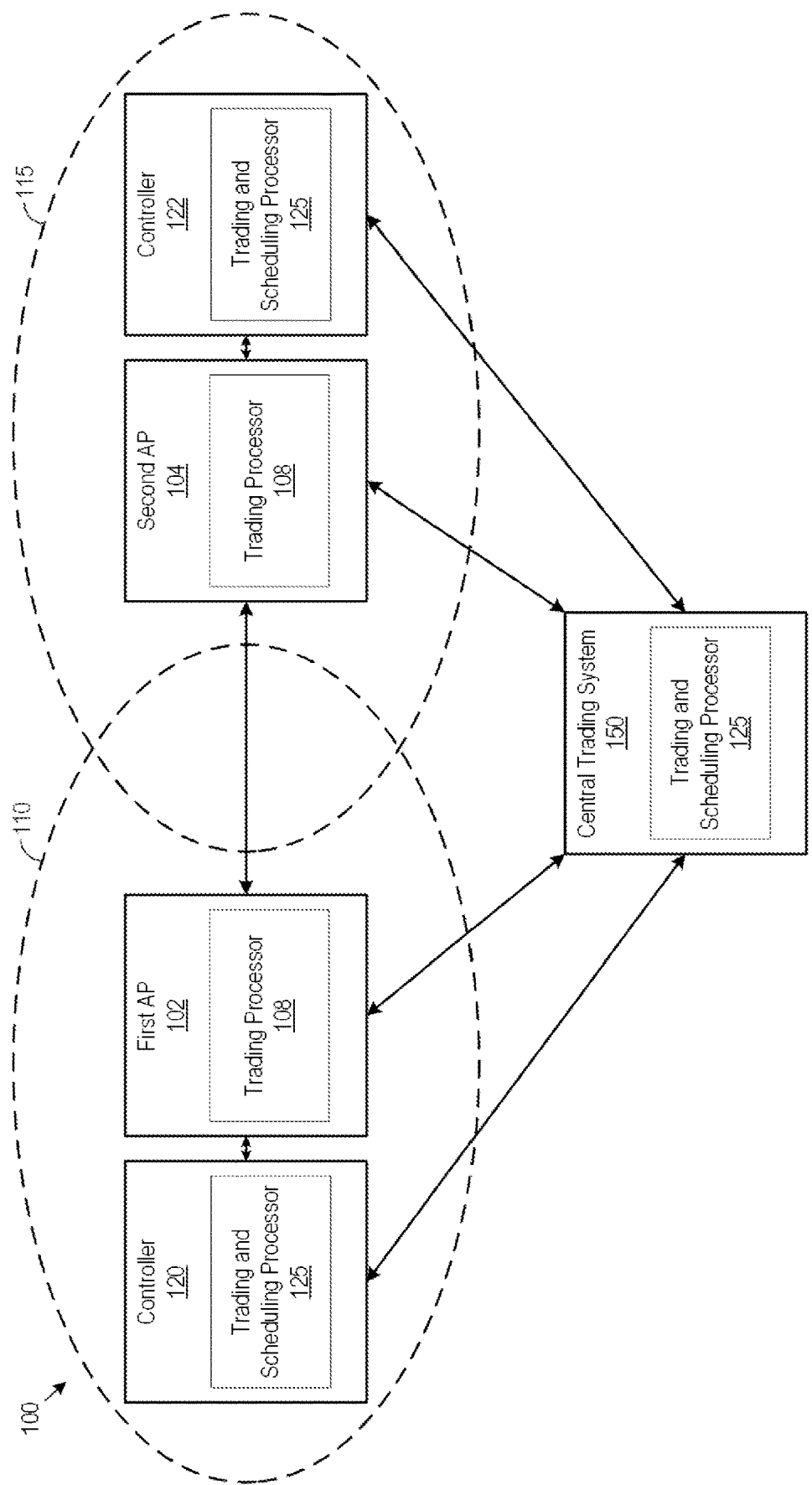
FIG. 1 is a block diagram of an operating environment for providing Time Sensitive Networking (TSN) Quality of Service (QoS) in overlapped administrative domains.

Time Sensitive Networking (TSN) Quality of Service (QoS) in overlapped administrative domains may be provided. A first Access Point (AP) may detect at least a second AP in a Co-Channel Interference (CCI) range. A micro-transaction auction between the first AP and at least the second AP may be established, and the first AP may provide compensation to second AP to acquire an agreement, from the second AP, to forgo transmitting during an upcoming service period. Next, the first AP may schedule transmissions for the service period and then transmit in the service period without interference from the second AP.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Two administrative domains may be in close enough physical proximity and the Basic Service Sets (BSS) of the administrative domains may interfere with one another. For example, two tenants in a multitenant building may each use a different Access Point (AP), and the traffic managed by the APs may interfere with each other. Wi-Fi networks may operate according to standards such as the Institute of Electrical and Electronics Engineers (IEEE) 802.11 standard. The standards may not provide TSN QoS guarantees, so interference between overlapping administrative domains may occur even if the standards are followed. The interference may be even more likely to occur in unlicensed spectrums, where users may compete with other users for priority.

FIG. 1 is a block diagram of an operating environment 100 for providing TSN QoS in overlapped administrative domains. The operating environment 100 may include a BSS 110 that includes a first AP 102 and a controller 120, a BSS 115 that includes a second AP 104 and a controller 122, and a central trading system 150. The BSS 110 and the BSS 115 may overlap in space and frequency (e.g., the AP 102 and the AP 104 may operate on the same channel, adjacent channels, or nearly adjacent channels, wherein the operations cause interference that affects the TSN performance on the serving channels). Therefore, the BSS 110 and the BSS 115 are Overlapping BSSs (OBSS), and the first AP 102 and the second AP 104 may interfere with each other because the first AP 102 and the second AP 104 are within a Co-Channel Interference (CCI) range.

The controller 120, the controller 122, and/or the central trading system 150 may be systems that are local to the first AP 102 and the second AP 104 or may be remote, such as systems of a cloud computing architecture. The controller 120, the controller 122, and/or the central trading system 150, may communicate to execute the methods described herein. In other examples, the controller 120, the controller 122, and/or the central trading system 150 may be fewer systems. For example, the controller 120, the controller 122, and/or the central trading system 150 may be a single system. The operating environment 100 may include any number of BSSs, APs, controllers, central trading systems, and/or other components in additional examples.

The first AP 102, the second AP 104, the controller 120, the controller 122, and/or the central trading system 150 may schedule service periods for transmissions by the first AP 102 and/or the second AP 104 to prevent transmissions from the first AP 102 and the second AP 104 from occurring at the same time. The service periods may be predetermined and repeat periodically (e.g., 90 Hertz (Hz), 80 Hz, 72 Hz, 60 Hz, 50 Hz, 1 Hz, every minute, hourly, daily). For example, the first AP 102, the second AP 104, and/or the trading and scheduling processors 125 of the controller 120, the controller 122, and/or the central trading system 150 may determine the typical or otherwise expected operation of the first AP 102 and the second AP 104 to determine the schedule of the service periods. The service periods may be signaled to clients, such as the first AP 102 and the second AP 104, via Quiet Periods, Target Wake Time (TWT) periods, restricted TWT (rTWT) periods, and the like.

The first AP 102, the second AP 104, the controller 120, the controller 122, and/or the central trading system 150 may execute a trading process to secure access to a scheduled service period. For example, the first AP 102 and the second AP 104 may use the trading processors 108 to conduct the trading process. The trading process may include an auction using compensation, such as a currency, to secure a service period. The currency may be a cryptocurrency, an interoperator currency, or the like, and the currency may be established by the network the first AP 102 and the first AP 102 operate on or by network standards organizations. The currency may be traded for fiat currencies. The controller 120, the controller 122, and/or the central trading system 150 may receive the transmission histories and other information from the first AP 102 and the second AP 104 to determine whether to conduct an auction for the first AP 102 and the second AP 104.

The auction may be a micro-transaction based auction for upcoming service periods. The auction may be performed directly between the first AP 102 and the second AP 104, such as via the trading processors 108, or the auction may be performed with trading and scheduling processors 125 of the controller 120, the controller 122, and/or the central trading system 150. The controller 120, the controller 122, and/or the central trading system 150, via the trading and scheduling processors 125, may send information regarding the service periods that indicate which APs want to participate in the auction for each service period, which service periods have been claimed, and the like. The auctions may be between any number of APs that are within a CCI range, including the first AP 102 and the second AP 104. The first AP 102 and the second AP 104 may have CCI ranges that include APs that the other AP does not interfere with. Thus, the auctions may occur in larger areas to address that APs are in a CCI range for one AP and not in a CCI range for another AP. In another example, an AP that wants to initiate an auction to secure a service period may use its associated CCI range to invite other APs to the auction. The AP initiating the auction may not be interfered with, during the service period, if the AP initiating the auction wins the auction. The auction may be conducted over the wired network when possible and wirelessly via peer discovery or via roaming exchange.

In an example, the auction for one or more specific service periods may be initiated based on APs interfering during service periods that were scheduled at the same time previously. In another example, an AP may initiate the auction for a specific service period when the AP is targeting the service period for transmissions and another AP is transmitting during service periods that were scheduled at the same time previously. In another example, auctions for every service period may be executed and if a single AP wants the service period, the auction may not take place and the AP may be assigned the service period. When multiple APs want the service period, the auction may take place.

In another example an auction may be conducted when an AP, such as the first AP 102, wants to secure one or more service periods assigned to another AP, such as the second AP 104. The auction may include the first AP 102 submitting bids that the second AP 104 and/or the controller 122 evaluate to determine whether the AP 104 will accept the bid and release the one or more service periods for the first AP 102 to be assigned. The AP 104 may set a value that the first AP 102 must bid above to accept the bid.

Then we have a (possibly null) set of APs with reserves that don't bid and another non-null set of APs that want to bid for the service periods. Obviously if the set of APs that want to for the service periods is null, then no auction occurs.

The auction may include the controller 120, the controller 122, the central trading system 150 or an AP, such as the first AP 102 or the second AP 104, hosting an auction for a service period for the APs within a CCI range or a range to address potentially infringing APs. The hosting controller 120, controller 122, central trading system 150, or AP may send an invitation to the APs within the CCI range to send bids to claim the service period. The auction may have any number of set ups, including an English auction, a Dutch auction, anonymous bidding with the highest bid winning, anonymous bidding with the highest bid winning and the winner AP paying the amount of the second highest bid, and the like.

Each auction may also be performed for multiple service periods. For example, the first AP 102 may need to reserve 1 millisecond for transmissions every 20 milliseconds. The first AP 102 may conduct an auction to acquire 1 millisecond service periods every 20 milliseconds. The first AP 102 may attempt to secure regularly scheduled service periods every 20 milliseconds (e.g., the first millisecond service period of the 20 millisecond period) or may attempt to secure any service period every 20 milliseconds. The auction may be used by the first AP 102 to secure regular service periods for a period, such as a minute, an hour, a day, a week, a year, etc. The first AP 102 may alter the period that the first AP 102 is trying to secure service periods for based on the current needs of the first AP 102, how the period affects the price of securing the service periods, and the like. Thus, each auction may be used to reserve multiple service periods to reduce the number of auctions performed by the APs.

Once an AP is assigned one or more service periods in an auction, other APs may pay the AP for the service periods. An AP that is assigned service periods may also request a refund when the AP no longer wants the service period. APs may also freely transfer currency. For example, an entity may own multiple APs and may transfer currency between the APs.

An entity may attempt to profit from the trading process. For example, the entity may try to cause APs outside of a range, such as a CCI, to participate in the trading process, purposely cause an AP associated with the entity to attempt to transmit during periods and/or interfere with transmissions of the first AP 102 and/or the second AP 104 to initiate the trading process, attempt to spawn fake APs to interfere and request money in the trading process, and the like. The controller 120, the controller 122, and/or the central trading system 150 may authenticate the first AP 102 and the second AP 104 before either of the APs may participate in the trading process to prevent unauthorized entities from trying to profit from the trading process. The controller 120, the controller 122, the central trading system 150, the first AP 102, and/or the second AP 104 may execute various additional mitigation techniques to prevent entities from trying to profit from the trading process.

To address fake APs, the controller 120, the controller 122, and/or the central trading system 150 may identify APs involved in auctions, ensure that each AP involved in auctions is correctly broadcasting its identity, detect fake APs via the physical layer, detect fake APs by monitoring financial account information associated with APs, and the like. Detecting fake APs via the physical layer may include checking if multiple APs have the same Received Signal Strength Indication (RSSI), Channel State Information (CSI), Angle of Arrival (AoA), Time Difference of Arrival (TDoA), and/or other physical layer characteristics. The controller 120, the controller 122, and/or the central trading system 150 may prevent identified fake APs from participating in the auctions or otherwise ignore identified fake APs during auctions and may implement penalties for detected fake APs, such as charging the AP associated with the fake APs, suspending the AP from participating in auctions notifying the entity associated with the AP, and the like. The winning bid may also be split equally between nearby APs mitigate the damage fake APs can cause to the auction process.

To address APs that are outside of a range attempting to participate in an auction, the controller 120, the controller 122, and/or the central trading system 150 may execute the auction via a secure wireless exchange or have at least a component of the auction comprise a secure wireless exchange. The controller 120, the controller 122, and/or the central trading system 150 may also address APs that attempt to initiate the trading process by transmitting when the AP does not need to, attempting to interfere with other APs, and the like with the goal of initiating trading process to collect bids. For example, the controller 120, the controller 122, and/or the central trading system 150 may monitor the typical schedule and operation of APs to determine changes in the schedule and operation and a subsequent attempt to participate in an auction associated with the changes. Additionally, the controller 120, the controller 122, and/or the central trading system 150 may determine if the transmissions are valid transmissions that have real data or if the transmissions are dummy transmissions for the purpose of transmitting during a service period. The controller 120, the controller 122, and/or the central trading system 150 may use machine learning techniques, Deep Packet Inspection (DPI), and/or Network Based Application Recognition (NBAR) to monitor the APs and detect the deliberate initiation of the trading process to collect bids. The identities of the APs in auctions may also be anonymized so APs do not know which APs are bidding against each other in the auctions. Additionally, the setup of the auction may be changed to help mitigate malicious attempts to initiate the trading process. For example, a Dutch auction and anonymous auctions may result in a malicious AP having to pay for a service period that the AP does not actually want to use. The APs participating in auctions may also intentionally lose auctions periodically to penalize bids from malicious APs.

Figure 2:
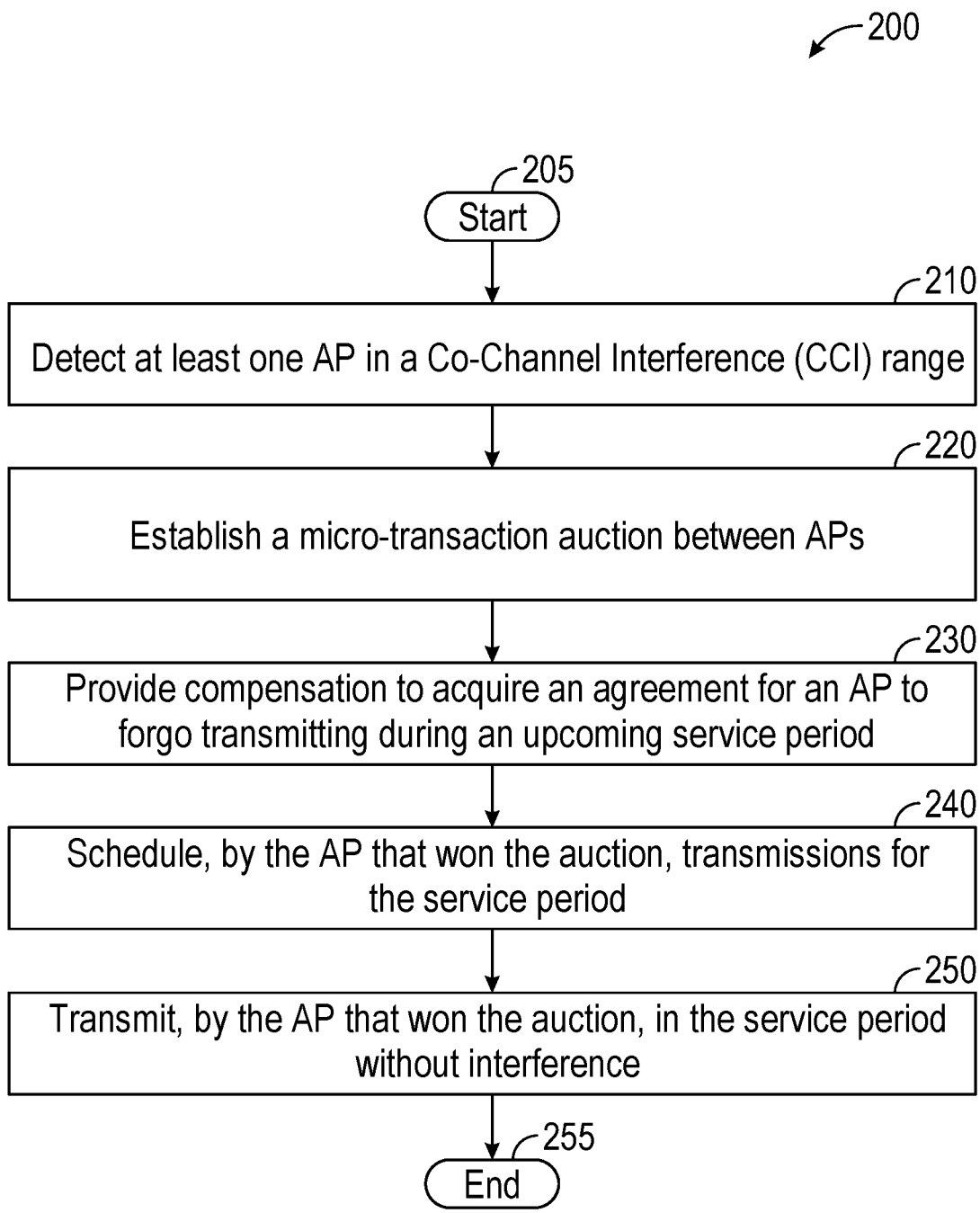
FIG. 2 is a flow chart of a method for providing TSN QoS in overlapped administrative domains.

FIG. 2 is a flow chart of a method 200 for providing TSN QoS in overlapped administrative domains. The method 200 may begin at starting block 205 and proceed to operation 210. In operation 210, an AP in a CCI range may be detected. For example, the first AP 102 may detect the second AP 104 in the CCI range of the first AP 102. Thus, the first AP 102 and the second AP 104 may interfere with each other when simultaneously transmitting.

In operation 220, a micro-transaction auction between a first AP and at least a second AP may be established. For example, the controller 120 may establish the micro-transaction auction between the first AP 102 and the second AP 104. The micro-transaction auction may include the first AP 102 and the second AP 104 submitting bids to secure service periods. The service periods may be assigned to the first AP 102 or the second AP 104 before the micro-transaction auction, and the other AP may initiate the auction to attempt to acquire the service periods from the assigned AP. The micro-transaction auction may be setup according to any auction format the controller 120, the controller 122, and/or the central trading system 150 may determine to use, such as a Dutch auction, an English auction, an auction anonymous bidding, and the like. The first AP 102 and the second AP 104 may submit bids directly to each other and inform the controller 120, the controller 122, and/or the central trading system 150 of the winning bid or may submit bids to the controller 120, the controller 122, and/or the central trading system 150. In response, the controller 120, the controller 122, and/or the central trading system 150 may inform the first AP 102 and the second AP 104 what the winning bid may be.

In operation 230, the first AP may acquire an agreement, from the second AP, to forgo transmitting during an upcoming service period by providing compensation to the second AP. For example, the first AP 102 may win the auction with the highest bid. The controller 120, the controller 122, and/or the central trading system 150 may inform the first AP 102 that the first AP 102 is the winner and the compensation that the first AP 102 owes to the second AP 104. The first AP 102 may provide the compensation owed to the second AP 104 to secure the service period(s) associated with the auction. In examples where the auction involves more than two APs, the first AP 102 may provide the compensation owed to each AP to secure the service period(s). The compensation to each AP may vary.

In operation 240, the first AP may schedule transmissions for the service period. For example, the first AP 102 may schedule downlink and/or uplink transmissions for the service period(s) secured by winning the micro-transaction auction. In operation 250, the first AP may transmit in the service period without interference from the second AP. For example, the first AP 102 may transmit the scheduled transmissions in the service period(s). The second AP 104 may not transmit during the service period(s) in response to receiving the compensation from the first AP 102 after the auction. The method 200 may conclude in ending block 255

Figure 3:
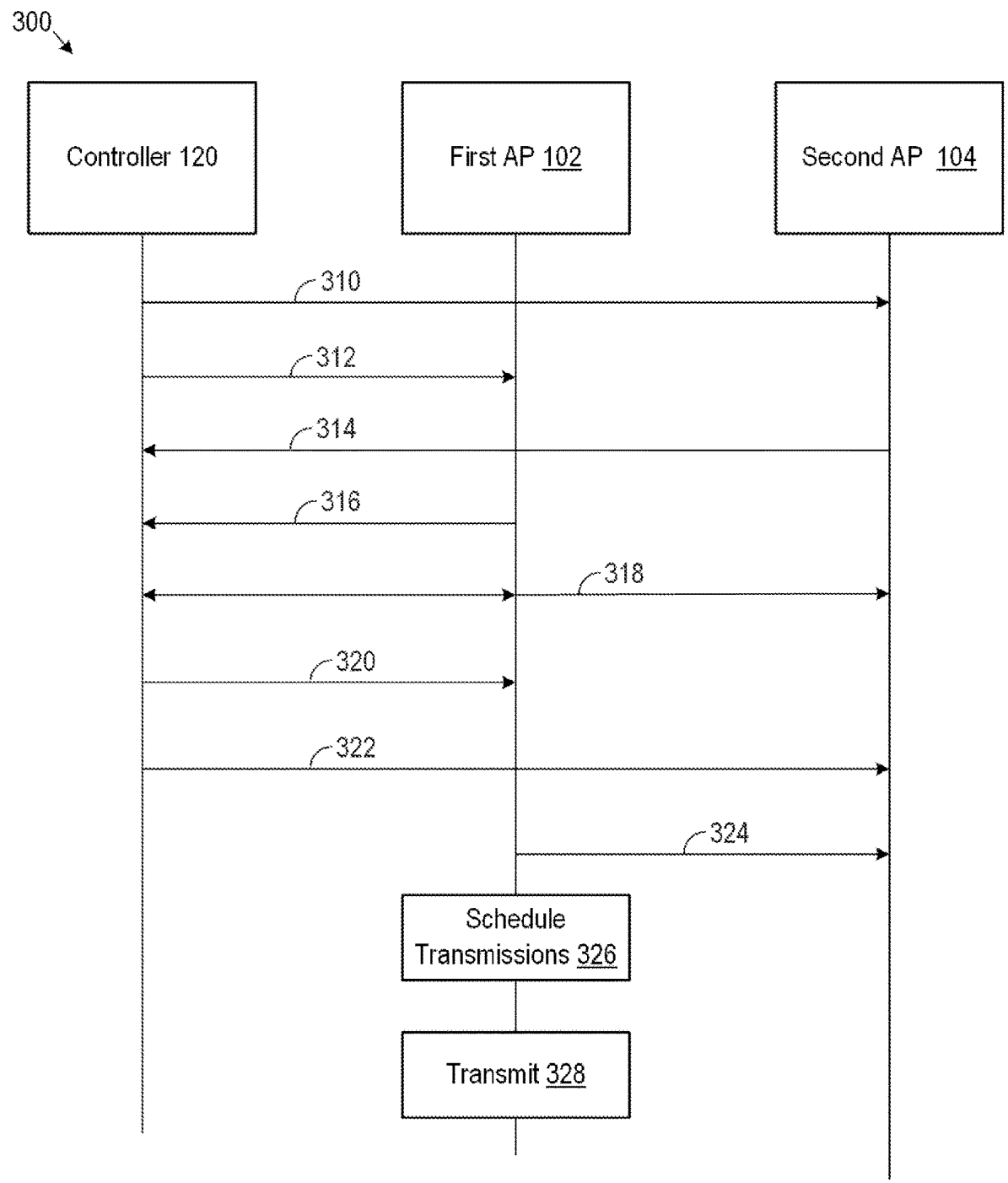
FIG. 3 is a signaling process for conducting an auction for providing TSN QoS in overlapped administrative domains.

FIG. 3 is a signaling process 300 for conducting an auction for providing TSN QoS in overlapped administrative domains between a controller 120, a first AP 102, and a second AP 104. In other examples, the signaling process may include the controller 122, and/or the central trading system 150, and the controller 122, and/or the central trading system 150 may replace the signaling processes of the controller 120 shown in FIG. 3. The signaling process 300 may begin with signal 310. In signal 310, the controller 120 may invite the second AP 104 to participate in an auction for one or more service periods. In signal 312, the controller 120 may invite the first AP 102 to also participate in the auction. The controller 120 may send the signal 310 and signal 312 in response to determining that an auction should be executed for the service period(s), for example because the first AP 102 and the second AP 104 are targeting transmission times during the service periods, interfering with each other during the service periods, or the like. The controller 120 may also send the signal 310 and signal 312 in response to the first AP 102 and/or the second AP 104 sending a message to the controller 120 requesting the initiation of the auction for the one or more service periods. The controller 120 may provide the first AP 102 and the second AP 104 with the format of the auction, the time to submit bids, and other information for the first AP 102 and the second AP 104 to participate in the auction in signal 310 and signal 312.

In signal 314, the second AP 104 may message the controller 120 to accept the invitation. The second AP 104 may also include a bid for the service period(s) of the auction. Similarly, the first AP 102 may message the controller 120 to accept the invitation in signal 316. The second AP 104 may also include a bid for the service period(s) of the auction. In signal 318, the controller 120 may host the auction, and the first AP 102 and the second AP 104 may participate in the auction. For example, the controller 120 requests bids from the first AP 102 and the second AP 104, determines when to end the bidding period of the auction, determines the winner of the auction, and the like. The first AP 102 and the second AP 104 may submit bids as needed during the auction.

In signal 320 and signal 322, the controller 120 informs the first AP 102 and the second AP 104 the results of the auction, respectively. The results may include the winner, the compensation the winner owes to the other AP, the service period(s) secured by the winning AP, and the like. In this example, the first AP 102 submitted the winning bid during the auction and secures the service periods. Therefore, in signal 320, the controller 120 may inform the first AP 102 the amount of compensation owed to the second AP 104. In signal 322, the controller 120 may inform the second AP 104 the amount of compensation owed by the first AP 102. Because the auction may be for multiple service periods, the first AP 102 and the second AP 104 may both win some of the service periods. Thus, the first AP 102 and the second AP 104 may both owe compensation to each other for the service periods secured.

In signal 324, the first AP 102 may provide the compensation to the second AP 104 to secure the service periods. The first AP 102 may provide the compensation directly to the second AP 104 or may causes a financial account associated with the first AP 102 to transfer compensation to a financial account associated with the second AP 104. Then, in operation 326, the first AP 102 may schedule transmissions during the secured service period, and the first AP 102 may transmit the scheduled transmissions in operation 328.

Figure 4:
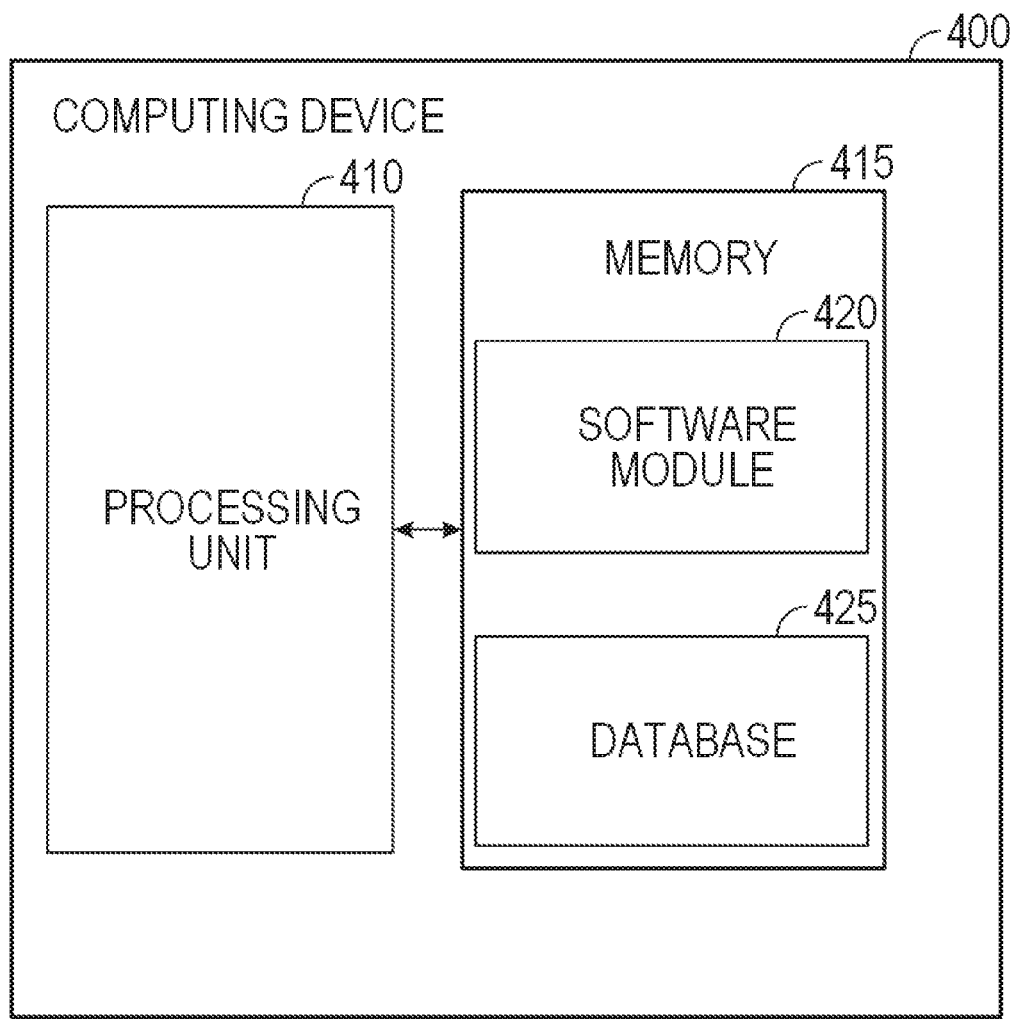
FIG. 4 is a block diagram of a computing device.

FIG. 4 is a block diagram of a computing device. As shown in FIG. 4, computing device 400 may include a processing unit 410 and a memory unit 415. Memory unit 415 may include a software module 420 and a database 425. While executing on processing unit 410, software module 420 may perform, for example, processes for providing TSN QoS in overlapped administrative domains as described above with respect to FIG. 1, FIG. 2, and FIG. 3. Computing device 400, for example, may provide an operating environment for the first AP 102, the second AP 104, the controller 120, the controller 122, the central trading system 150, and/or any other system described herein. The first AP 102, the second AP 104, the controller 120, the controller 122, the central trading system 150, and/or any other system described herein may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
    detecting, by a first access point (AP), at least a second AP in a Co-Channel Interference (CCI) range;
    establishing a micro-transaction auction between the first AP and at least the second AP;
    providing compensation, from the first AP to the second AP based on the micro-transaction auction, to acquire an agreement, from the second AP, to forgo transmitting during an upcoming service period;
    scheduling, by the first AP, transmissions for the service period; and
    transmitting, by the first AP, in the service period without interference from the second AP.

2. The method of claim 1, wherein the compensation comprises a currency.

3. The method of claim 1, further comprising conducting the micro-transaction auction, wherein conducting the micro-transaction auction comprises receiving a first bid from the first AP and a second bid from the second AP.

4. The method of claim 3, further comprising:
    determining the first bid wins the micro-transaction auction; and
    informing the first AP that the first AP wins the micro-transaction auction and the compensation owed to the second AP, wherein providing the compensation from the first AP to the second AP is in response to informing the first AP that the first AP wins the micro-transaction auction and the compensation owed to the second AP.

5. The method of claim 3, wherein the micro-transaction auction is hosted via an exchange.

6. The method of claim 1, further comprising:
    detecting a fake AP attempting to participate in the micro-transaction auction; and
    preventing the AP from participating the micro-transaction auction.

7. The method of claim 1, further comprising:
    detecting a third AP with a goal of initiating trading process to collect bids attempting to participate in the micro-transaction auction; and
    preventing the third AP from participating in the micro-transaction auction.

8. A system comprising:
    a memory storage; and
    a processing unit coupled to the memory storage, wherein the processing unit is operative to:
        detect at least first access point (AP) and a second AP in a Co-Channel Interference (CCI) range;
        establish a micro-transaction auction between at least the first AP and the second AP;
        provide compensation, from the first AP to the second AP based on the micro-transaction auction, to acquire an agreement, from the second AP, to forgo transmitting during an upcoming service period;
        schedule, by the first AP, transmissions for the service period; and
        transmit, by the first AP, in the service period without interference from the second AP.

9. The system of claim 8, wherein the compensation comprises a currency.

10. The system of claim 8, wherein the processing unit is further operative to conduct the micro-transaction auction, wherein conducting the micro-transaction auction comprises receiving a first bid from the first AP and a second bid from the second AP.

11. The system of claim 10, wherein the processing unit is further operative to:
    determine the first bid wins the micro-transaction auction; and
    inform the first AP that the first AP wins the micro-transaction auction and the compensation owed to the second AP, wherein to provide the compensation from the first AP to the second AP is in response to informing the first AP that the first AP wins the micro-transaction auction and the compensation owed to the second AP.

12. The system of claim 10, wherein the micro-transaction auction is hosted via an exchange.

13. The system of claim 8, wherein the processing unit is further operative to:
    detect a fake AP attempting to participate in the micro-transaction auction; and
    prevent the AP from participating in the micro-transaction auction.

14. A non-transitory computer-readable medium that stores a set of instructions which when executed perform a method executed by the set of instructions comprising:
    detecting, by a first access point (AP), at least a second AP in a Co-Channel Interference (CCI) range;
    establishing a micro-transaction auction between the first AP and at least the second AP;
    providing compensation, from the first AP to the second AP based on the micro-transaction auction, to acquire an agreement, from the second AP, to forgo transmitting during an upcoming service period;

scheduling, by the first AP, transmissions for the service period; and transmitting, by the first AP, in the service period without interference from the second AP.

15. The non-transitory computer-readable medium of claim 14, wherein the compensation comprises a currency.

16. The non-transitory computer-readable medium of claim 14, further comprising conducting the micro-transaction auction, wherein conducting the micro-transaction auction comprises receiving a first bid from the first AP and a second bid from the second AP.

17. The non-transitory computer-readable medium of claim 16, further comprising:

determining the first bid wins the micro-transaction auction; and informing the first AP that the first AP wins the micro-transaction auction and the compensation owed to the second AP, wherein providing the compensation from the first AP to the second AP is in response to informing the first AP that the first AP wins the micro-transaction auction and the compensation owed to the second AP.

18. The non-transitory computer-readable medium of claim 16, wherein the micro-transaction auction is hosted via an exchange.

19. The non-transitory computer-readable medium of claim 14, wherein the service period is assigned to the second AP before the micro-transaction auction.

20. The non-transitory computer-readable medium of claim 14, further comprising:

determining, by the first AP, not to transmit during a second service period assigned to the first AP;

requesting, by the first AP, a refund to release the second service period;

receiving, by the first AP, the refund; and foregoing, by the first AP transmitting during the second service period in response to receiving the refund.

* * * * *